United States Patent [19]

Suzuki

[11] Patent Number: 4,876,683
[45] Date of Patent: Oct. 24, 1989

[54] REPEATER FOR REGENERATING FRAME-MULTIPLEXED SIGNAL

[75] Inventor: Eiji Suzuki, Tochigi, Japan

[73] Assignee: Fujitsu Limited, Kawasaki, Japan

[21] Appl. No.: 323,942

[22] Filed: Mar. 15, 1989

[30] Foreign Application Priority Data

Mar. 16, 1988 [JP] Japan .................................. 63-060219

[51] Int. Cl.⁴ ............................................... H04J 3/06
[52] U.S. Cl. ...................................... 370/97; 370/105.1
[58] Field of Search ..................... 370/97, 100; 375/3, 375/4, 118, 119, 106

[56] References Cited

U.S. PATENT DOCUMENTS

3,962,635  6/1976  Roza ..................................... 370/97
3,986,053 10/1976  Döemer ................................ 370/97

FOREIGN PATENT DOCUMENTS

52-150952 12/1987 Japan.

OTHER PUBLICATIONS

English abstract of Japanese Application No. JPA52-150952.

Primary Examiner—Douglas W. Olms
Attorney, Agent, or Firm—Staas & Halsey

[57] ABSTRACT

A repeater which receives a frame-multiplexed signal, extracts a receiving clock from the signal, and detects a timing of frame synchronization. The receiving clock and a master clock are input into a selector, the output of the selector is supplied for frame regeneration through a clock phase gradual shift circuit, and the detected timing is supplied for frame synchronization in the regenerated frame-multiplexed signal through a gate. Normally, the receiving clock and the detected timing is supplied for the frame regeneration, however, when the detection of the timing of frame synchronization fails, the output of the selector is switched to the master clock and the gate becomes off, and when the detection of the timing of frame synchronization is recovered and the detected timing of frame synchronization and a timing of frame synchronization is regeneration, which is generated from the master clock, coincide, the output of the selector is switched back to the receiving clock and the gate simultaneously becomes on. Further, in the clock phase gradual shift circuit, normally, an output clock synchronizes with an input clock, and a phase shift resulting from an abrupt phase shift occurring in the input clock gradually appears in an output clock after the abrupt phase shift in the input clock.

3 Claims, 6 Drawing Sheets

REPEATER FOR REGENERATING FRAME-MULTIPLEXED SIGNAL

BACKGROUND OF THE INVENTION

1. Field of the Invention

The present invention relates to a repeater for receiving and regenerating a frame-multiplexed signal, wherein a timing signal, i.e., a clock, is extracted from the received signal, a timing of frame synchronization is detected in the received signal, and data included in the received signal is again incorporated in a regenerated frame-multiplexed signal and retransmitted.

2. Description of the Related Art

Figure 1:
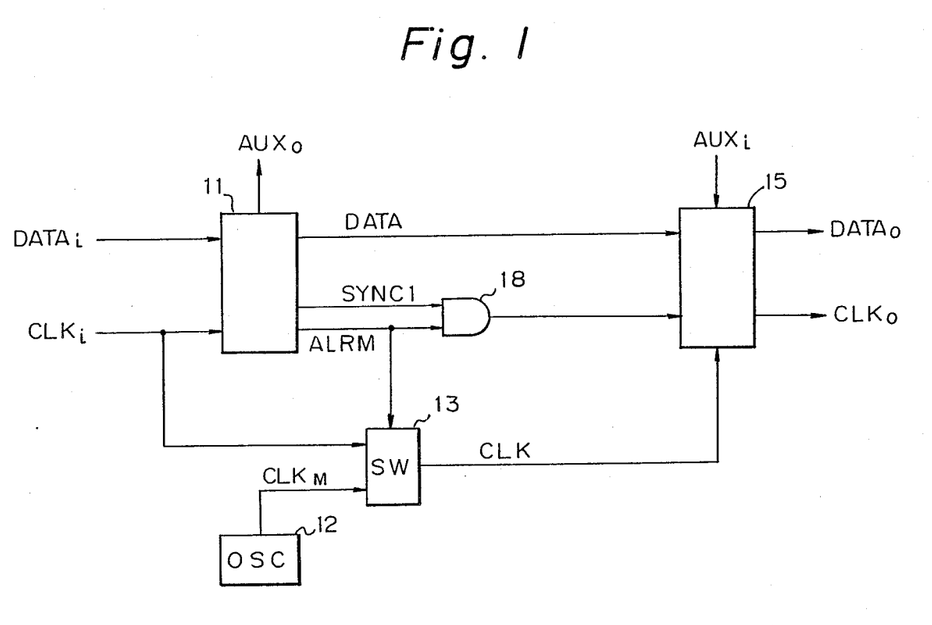
FIG. 1 shows a part of a construction of the conventional repeater relating to the present invention.

FIG. 1 shows a part of the construction of a conventional repeater, relating to the present invention.

In FIG. 1, reference numeral 11 denotes a frame synchronization circuit, 12 denotes a master clock generator, 13 denotes a selector swich, 15 denotes a frame regenerating circuit, and 18 denotes an AND gate.

A frame-multiplexed signal, which has been transmitted on a transmission line (not shown) or on a radio channel, along which the repeater of FIG. 1 is located, is demodulated in a demodulator (not shown), and a timing signal (hereinafter called a receiving clock) is extracted from the demodulated signal in a timing (extracting) circuit (not shown). The demodulated (data) signal is denoted by $DATA_i$, and the receiving clock is denoted by $CLK_i$.

The frame synchronization circuit 11 detects a timing of frame synchronization for each frame, for example, by detecting a predetermined frame synchronization pattern in each frame. By the frame synchronization, the predetermined frame synchronization pattern and an auxiliary signal $AUX_o$, which transmits, for example, statuses (including alarm) of the repeater and the transmission line, are separated. And the remaining data after the auxiliary signal $AUX_o$ and the predetermined frame synchronization pattern are separated, i.e., real data transmitted through the transmission line, which is denoted by DATA, is input into the frame regenerating circuit 15.

The timing of frame synchronization for each frame is output from the frame synchronization circuit 11 as a frame synchronization signal SYNC1 (hereinafter called received frame synchronization signal). In addition, the frame synchronization circuit 11 outputs an alarm signal ALRM, when the above-mentioned frame synchronization timing cannot be detected. A failure in the detection of the timing of frame synchronization occurs, for example, due to a break in a transmission line, a malfunction in the preceding repeater or terminal station, or a high error rate in a received (data) signal.

Normally, the receiving clock $CLK_i$ and the received frame synchronization signal SYNC1 are input into the frame regenerating circuit 15. An auxiliary signal $AUX_i$, which may includes a status of the repeater, or other information to be transmitted from the repeater to a terminal station, is also input into the frame regenerating circuit 15.

The frame regenerating circuit 15 regenerates frame-multiplexed data, i.e., receives the real data signal DATA and the auxiliary signal $AUX_i$ as data signals, and the receiving clock $CLK_i$ and the received frame synchronization signal SYNC1 as timing signals, and then multiplexes the real data signal DATA and the auxiliary signal $AUX_i$ to form a frame-multiplexed data signal $DATA_o$.

In the process of regeneration, the frame regenerating circuit 15 generates and inserts the predetermined frame synchronization pattern into each frame at a timing determined by a frame synchronization signal generated in the frame regenerating circuit 15 (hereinafter called regeneration frame synchronization signal).

The regeneration frame synchronization signal generated in the frame regenerating circuit 15, usually synchronizes with the received frame synchronization signal SYNC1, i.e., the received frame synchronization signal SYNC1 is used as the regeneration frame synchronization signal. However, if the received frame synchronization signal SYNC1 is not supplied to the frame regenerating circuit 15, the regeneration frame synchronization signal is generated from a clock supplied to the frame regenerating circuit 15.

The repeater also comprises a master clock generator 12, which generates a master clock $CLK_m$. The master clock $CLK_m$ and the aforementioned receiving clock $CLK_i$ are input into the selector switch 13. The selector switch 13 selectively outputs the master clock $CLK_m$ or the receiving clock $CLK_i$ according to whether or not the alarm signal ALRM is active, i.e., whether the alarm signal ALRM is "ON" or "OFF". Therefore, when the frame synchronization circuit 11 fails to detect the timing of frame synchronization, the master clock $CLK_m$, instead of the receiving clock $CLK_i$, is supplied to the frame regenerating circuit 15.

Further, the received frame synchronization signal SYNC1 is supplied to the frame regenerated circuit 15 through an AND gate 18, wherein the alarm signal ALRM is input into one terminal of the AND gate 18 as a gate signal to control the input of the received frame synchronization signal SYNC1 into the frame regenerating circuit 15. Therefore, the received frame synchronization signal SYNC1 is input into the frame regenerating circuit 15 only when the frame synchronization circuit 11 successfully detects the timing of frame synchronization.

The frame-multiplexed data $DATA_o$ is output with an output clock $CLK_o$, which has the same frequency as the output of the selector switch 13.

The above output data signal $DATA_o$ is input into a modulator (not shown) with the output clock $CLK_o$, and then the modulated signal is transmitted on a transmission line or on a radio channel.

Since there is generally a phase difference between clocks generated independently in two sources, when the clock supplied to the frame regenerating circuit 15 is switched from a receiving clock $CLK_i$ to the master clock $CLK_m$, or switched in the opposite direction, in the above construction, a clock having an abrupt phase difference from the preceding clock is input into the frame regenerating circuit 15, and therefore, a loss of frame synchronization occurs.

The loss of frame synchronization also causes a loss of frame synchronization in the following repeater, i.e., the loss of frame synchronization propagates in the following repeaters one by one in a transmission system having a plurality of repeaters.

Each repeater can independently recover frame synchronization from the above out-of-synchronization state, however, it takes a considerable time for the recovery, for example, 40 msec for each repeater.

When a malfunction is detected in a repeater, the occurrence of the malfunction must be reported to a terminal station, however, often in such a situation, the above loss of frame synchronization also occurs, simultaneously and therefore, a large information delay occurs.

In particular, in a system wherein a stand-by line is provided in addition to a line in operation, when a malfunction occurs in the line in operation, the occurrence of the malfunction must be reported to a station which controls switching between two lines, to recover the communication by switching from the malfunctioning line to the stand-by line as quickly as possible.

However, if the out-of-frame-synchronization state propagates in the following repeaters successively, the aforementioned large recovery time accumulates in each repeater, and consequently, a large total delay will be caused.

Therefore, a repeater is requred wherein the occurrence of a loss of frame synchronization can be avoided when a clock used to regenerate a frame data is switched to another clock.

In addition, when frame synchronization in a frame synchronization circuit has recovered, i.e., a detection of a timing of frame synchronization for each frame becomes possible after a failure of the detection, the regenerated signals must again be synchronized with the receiving clock and the detected timing of frame synchronization. However, the timing of frame synchronization in a regenerated frame-multiplexed signal is determined by a regeneration frame synchronization signal generated from the master clock $CLK_m$, i.e., the timing of frame synchronization in a regenerated frame-multiplexed signal is independent from the received frame synchronization signal SYNC1. Therefore, if, in the construction of FIG. 1, the alarm signal ALRM becomes ON, the regeneration frame synchronization signal in the frame regenerating circuit 15 is abruptly changed to the received frame synchronization signal SYNC1. This abrupt change may cause an abrupt shift in the timing of frame synchronization, i.e., this may cause a loss of frame synchronization.

SUMMARY OF THE INVENTION

The object of the present invention is to provide a repeater wherein the occurrence of a loss of frame synchronization can be avoided when a clock used to regenerate a frame-multiplexed signal is switched to another clock.

According to the present invention, there is provided a repeater comprising: a received frame timing detecting portion which extracts a receiving clock from a received frame-multiplexed signal, detects a timing of frame synchronization in the received signal, and outputs an alarm signal which indicates whether or not the timing of frame synchronization is successfully detected; a master clock generator which generates a master clock; a frame synchronization phase comparator which detects a coincidence between the timing of frame synchronization detected in the received signal and a timing of frame synchronization in a regenerated frame-multiplexed signal; a switching circuit the output of which is the receiving clock except: the output is switched to the master clock when the alarm signal indicates a failure in detection, and the output is switched back to the receiving clock when the alarm signal indicates a successful detection and the coincidence is simultaneously detected; a clock phase gradual shift circuit which receives the output of the switching circuit as an input clock, outputs an output clock synchronized with the input clock except that a phase shift resulting from an abrupt phase shift occurring in the input clock gradually appears in an output clock after the abrupt phase shift in the input clock; a frame regenerating portion which receives the output of the clock phase gradual shift circuit as a clock, determines the timing of frame synchronization in a regenerated frame-multiplexed signal, and regenerates a frame-multiplexed signal corresponding to the received signal, wherein the timing of the frame synchronization in the regenerated frame-multiplexed signal is synchronized with the timing of frame synchronization detected in the received signal when the timing of frame synchronization is supplied, and the timing of frame synchronization in the regenerated frame-multiplexed signal is generated from the output of the clock phase gradual shift circuit when the timing of frame synchronization is not supplied; and a gate which receives the timing of frame synchronization detected in the received signal and supplies the timing of frame synchronization only when the alarm signal indicates a successful detection and the coincidence is simultaneously detected.

DESCRIPTION OF THE PREFERRED EMBODIMENTS

Figure 2:
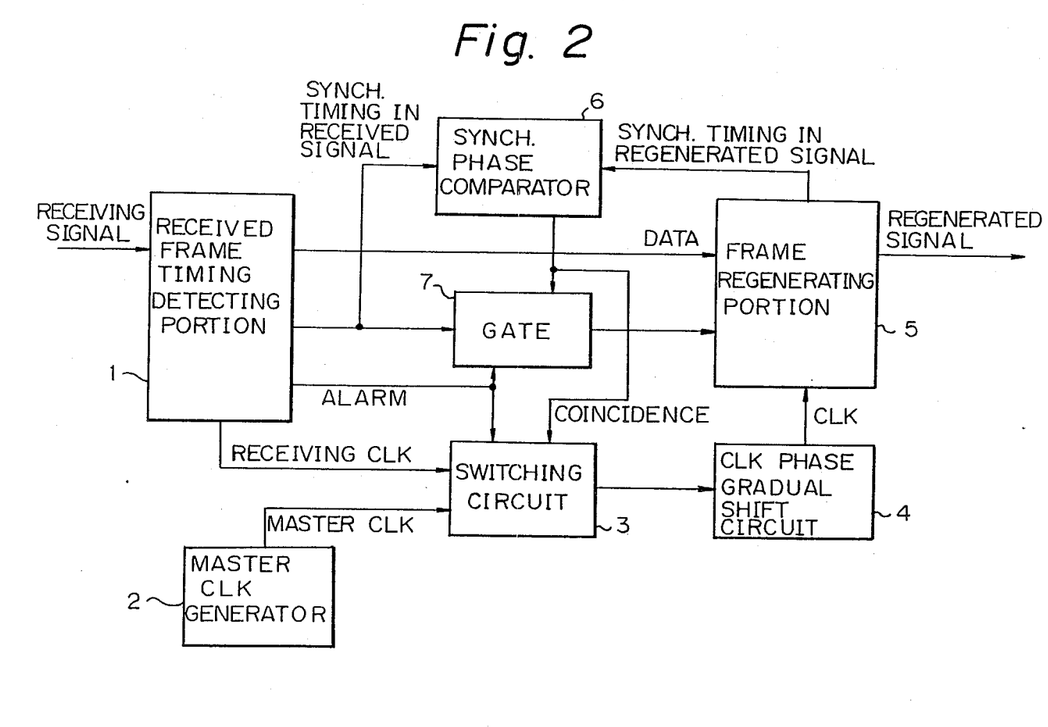
FIG. 2 shows the basic construction of a repeater according to the present invention.

FIG. 2 shows the basic construction of a repeater according to the present invention.

In FIG. 2, reference numeral 1 denotes a received frame timing detecting portion, 2 denotes a master clock generator, 3 denotes a switching circuit, 4 denotes a clock phase gradual shift circuit, 5 denotes a frame regeneration portion, 6 denotes a frame synchronization phase comparator, and 7 denotes a gate.

The received frame timing detecting portion 1 extracts a receiving clock from a received frame-multiplexed signal, detects a timing of frame synchronization in the received signal, and outputs an alarm signal which indicates whether or not the timing of frame synchronization is successfully detected.

The master clock generator 2 generates a master clock.

The frame synchronization phase comparator 6 detects a coincidence between the timing of frame synchronization detected in the received signal and a timing of frame synchronization in a regenerated frame-multiplexed signal.

The switching circuit 3 outputs the receiving clock except, the output of the switching circuit 3 is switched to the master clock when the alarm signal indicates a failure of the detection, and the output is switched back to the receiving clock when the alarm signal indicates a successful detection of frame synchronization and the coincidence is simultaneously detected.

The clock phase gradual shift circuit 4 receives the output of the switching circuit 3 as an input clock, outputs an output clock synchronized with the input clock except that a phase shift resulting from an abrupt phase shift occurring in the input clock, gradually appears in an output clock after the abrupt phase shift in the input clock.

The frame regenerating portion 5 receives the output of the clock phase gradual shift circuit 4 as a clock, determines the timing of frame synchronization in a regenerated frame-multiplexed signal, and regenerates the frame-multiplexed signal corresponding to the received signal, wherein the timing of frame synchronization in the regenerated frame-multiplexed signal is synchronized with the timing of frame synchronization detected in the received signal when the timing of frame synchronization is supplied, and the timing of frame synchronization in the regenerated frame-multiplexed signal is generated from the output of the clock phase gradual shift circuit 4 when the timing of frame synchronization is not supplied.

The gate 7 receives the timing of frame synchronization detected in the received signal and supplies the timing of frame synchronization only when the alarm signal indicates a successful detection and the coincidence is simultaneously detected.

Therefore, according to the above construction, first, an abrupt phase shift in the input clock in the frame regeneration portion, which may occur when the input clock is switched from one to another, is eliminated by the clock phase gradual shift circuit 4.

Further, when frame synchronization in the received signal recovers from a failure of detection of the timing of frame synchronization, in the above construction, generally, a clock output at the switching circuit is not switched to the receiving clock immediately, and the timing of frame synchronization detected in the received signal is also not supplied to the frame regenerating portion 5 through the gate 2 immediately. Thus, when a coincidence between the timing of frame synchronization detected in the received signal and the timing of frame synchronization in the regenerated signal is detected in the synchronization signal phase comparator 6, the clock output at the switching circuit 3 is switched to the receiving clock, and the timing of frame synchronization detected in the received signal is supplied to the frame regenerating portion 5 through the gate 2.

Therefore, no phase shift arises in the timing of frame synchronization in the frame regenerating portion 5 even when the timing is changed from the timing generated from the master clock $CLK_m$ to the timing of frame synchronization which is supplied from the received frame timing detecting portion 1.

Through the above operation according to the present invention, conventional factors which may cause a loss of frame synchronization, are eliminated.

Figure 3:
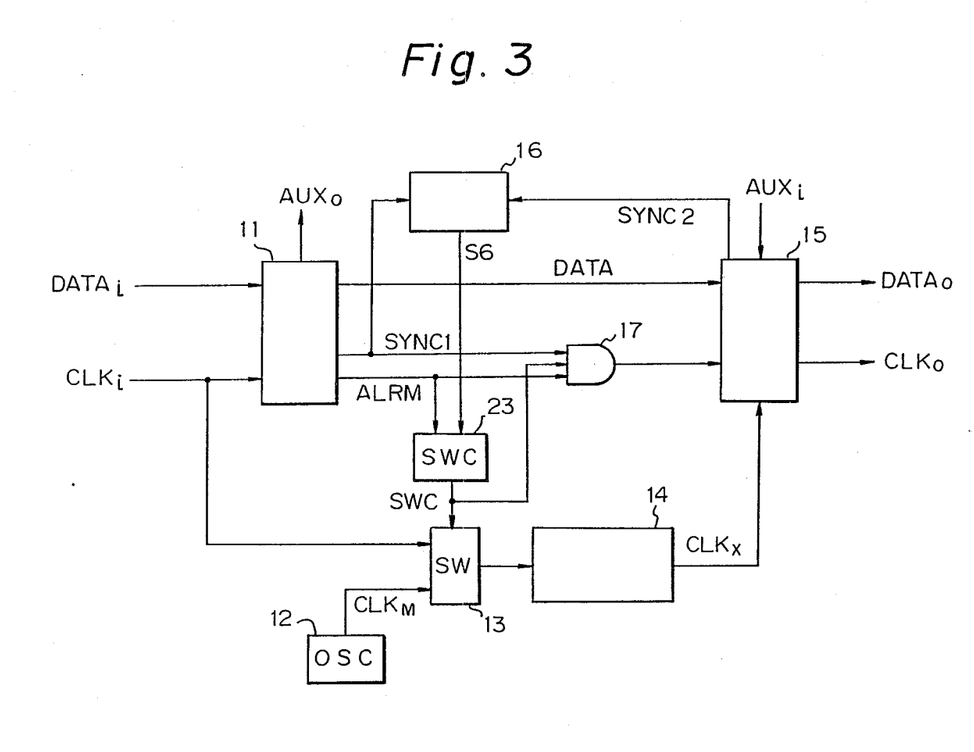
FIG. 3 shows the construction of an embodiment of the present invention.

FIG. 3 shows the construction of an embodiment of the present invention.

In FIG. 3, reference numeral 14 denotes a clock phase gradual shift circuit, 16 denotes a synchronization signal phase comparator, 23 denotes a switching control circuit, and 17 denotes an AND gate. All of the other components shown in FIG. 3 are the same as the corresponding components shown in FIG. 1 having the same denotation.

In the construction of FIG. 3, the aforementioned frame synchronization signal generated in the frame regenerating circuit 15 (hereinafter called regeneration frame synchronization signal, and denoted by SYNC2) is output from the frame regenerating circuit 15 and is then input into one of the input terminals of the synchronization signal phase comparator 6. The received frame synchronization signal SYNC1 is input into the other input terminal of the synchronization signal phase comparator 6. The output of the synchronization signal phase comparator 6, denoted by S6, is applied to one input terminal of the switch control circuit 23, and becomes ON when the received frame synchronization signal SYNC1 and the regeneration frame synchronization signal SYNC2, coincide.

The aforementioned alarm signal ALRM is applied to the other input terminal of the switch control circuit 23. The alarm signal ALRM is also applied to one input terminal of the AND gate 17. The other two inputs of the AND gate 17 are the received frame synchronization signal SYNC1 and the output of the switch control circuit 23. The output of the AND gate 17 is supplied to the frame regenerating circuit 15. The AND gate 17 and the switch control circuit 23 correspond to the gate 7 shown in FIG. 2. The switch control circuit 23 is realized by an AND gate.

The output of the switch control circuit 23 is also applied to a control input terminal of the selector switch 13. The output of the selector switch 13 is input into the clock phase gradual shift circuit 14.

The function of the clock phase gradual shift circuit 14 is the same as the corresponding circuit 4 shown in FIG. 2. The output of the clock phase gradual shift circuit 14, which is denoted by $CLK_x$, is supplied to the frame regenerating circuit 15.

Figure 4:
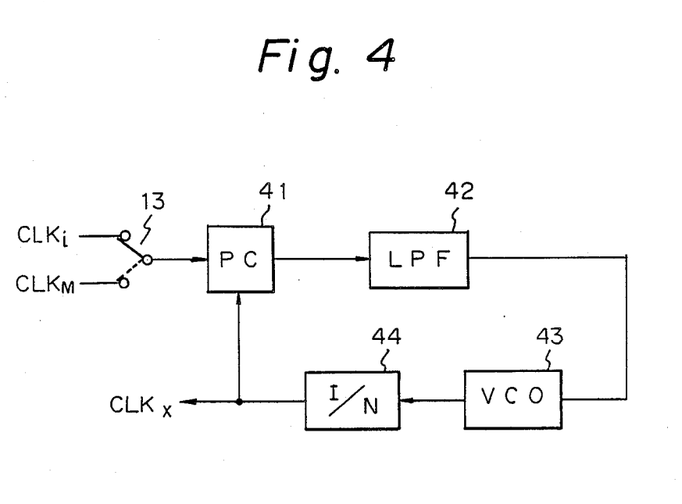
FIG. 4 shows a block diagram of a phase-lock loop circuit as a realization of the clock phase gradual shift circuit 6.

FIG. 4 shows a block diagram of an example of the clock phase gradual shift circuit 4 in FIG. 2 or 14 in FIG. 3.

In FIG. 4, reference numeral 41 denotes a phase comparator, 42 denotes a low pass filter, 43 denotes a voltage controlled oscillator, and 44 denotes a frequency divider.

Figure 5:
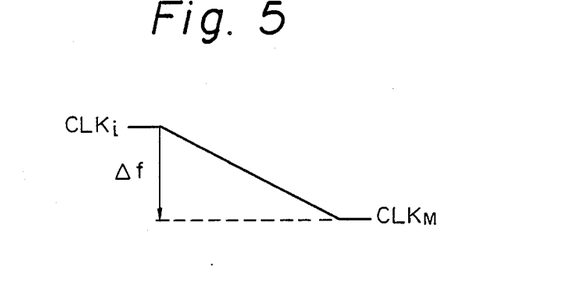
FIG. 5 shows a gradual change of the frequency of the output of the clock phase gradual shift circuit 6.

As can be seen, the construction of FIG. 4 is a well-known phase-lock loop (PLL) circuit, and the PLL circuit can realize the aforementioned function of the clock phase gradual shift circuit 4 in FIG. 2. The initial phase difference between the receiving clock $CLK_i$ and the master clock $CLK_m$ is detected in the phase comparator 41 as an abrupt phase shift of the input clock, and a control to gradually decrease the phase shift detected in the phase comparator 41 is carried out through the loop construction of the phase comparator 41, the low pass filter 42, the voltage controlled oscillator 43 and the frequency divider 44. According to the gradual decrease of the phase shift, the frequency of the output $CLK_x$ of the PLL circuit gradually approaches the frequency of the master clock $CLK_m$, as shown in FIG. 5.

Figure 6:
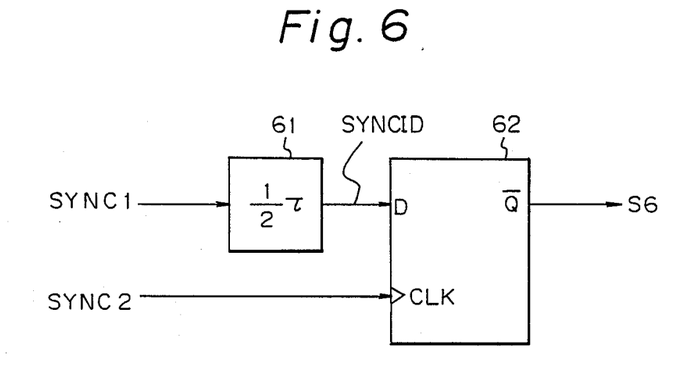
FIG. 6 shows the construction of an example of the synchronization signal phase comparator 7.

FIG. 6 shows the construction of an example of the synchronization signal phase comparator 6 in FIG. 2, or 16 in FIG. 3.

In FIG. 6, reference numeral 61 denotes a delay circuit, and 62 denotes a D-type flip-flop circuit.

The delay circuit 61 delays the timing of the input signal by on half of the clock period $\tau$. The received synchronization signal SYNC1 is input into the delay circuit 61, and the output, which is denoted by SYNC1D, is applied to the D input terminal of the D-type flip-flop circuit 62. The regeneration synchronization signal SYNC2 is applied to the edge trigger input terminal of the D-type flip-flop circuit 62.

Figure 7:
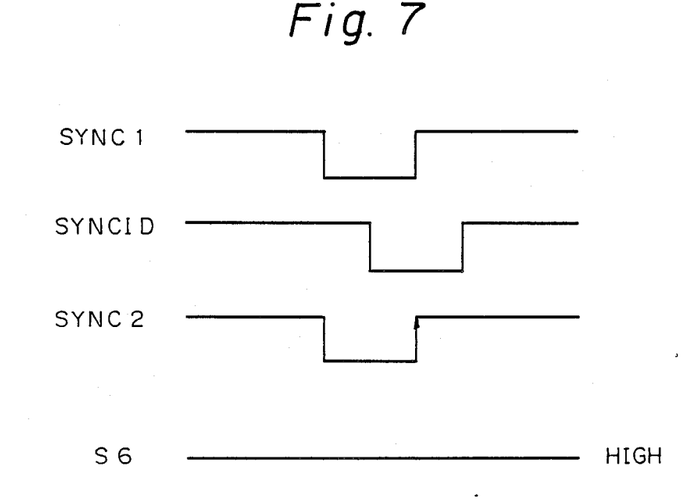
FIG. 7 shows a timing of the operation of the synchronization signal phase comparator 7.

FIG. 7 shows the timing of the above signals when the coincidence between the received synchronization signal SYNC1 and the regeneration synchronization signal SYNC2 is detected. Namely, when the above two signals SYNC1 and SYNC2 coincide, the delayed signal SYNC1D is always at the LOW level at the timing of the leading edge of the signal SYNC2, and therefore, the output of the synchronization signal phase comparator, which is the inverted output, is HIGH. When the above two signals SYNC1 and SYNC2 do not coincide, the output of the synchronization signal phase comparator is LOW.

Figure 8:
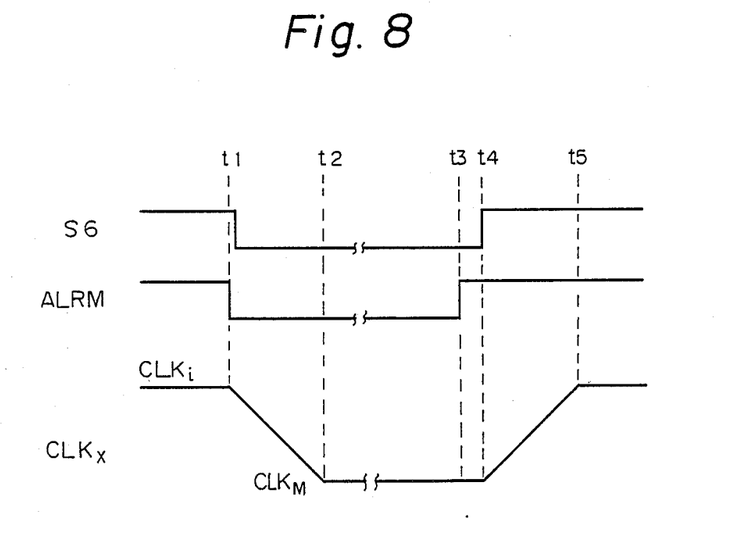
FIG. 8 shows a timing of the operation of the construction of an embodiment of the present invention.

FIG. 8 shows the timing of the construction of FIG. 3. At time t1, frame synchronization in the frame synchronization circuit 11 has failed. Immediately the frame synchronization signal SYNC1 is stopped at the AND gate 17 and the alarm signal ALRM becomes LOW. Therefore, the output of the switch control circuit 23 becomes LOW, and the output clock of the selector switch 13 is then switched from the receiving clock $CLK_i$ to the master clock $CLK_m$. As mentioned above, the phase and the frequency of the output $CLK_x$ of the clock phase gradual shift circuit 14 is gradually shifted to coincide with the master clock $CLK_m$, and reaches coincidence at the time t2.

At time t3, frame synchronization in the frame synchronization circuit 11 has recovered. However, at this time, the output signal S6 of the synchronization signal phase comparator is LOW, i.e., the frame synchronization signals SYNC1 and SYNC2 do not coincide. Since the frequencies of the receiving clock $CLK_i$ and the master clock $CLK_m$ are different, the frame synchronization signals SYNC1 and SYNC2 coincide at an interval determined by the frequency difference. Therefore, after an interval, at time t4, the output signal S6 of the synchronization signal phase comparator becomes HIGH. Accordingly, the output of the switch control circuit 23 becomes HIGH, and thus the frame synchronization signal SYNC1 is applied to the frame regenerating circuit 15 through the AND gate 17, and the output clock of the selector switch 13 is switched back to the receiving clock $CLK_i$.

Again, as mentioned above, the phase and the frequency of the output $CLK_x$ of the clock phase gradual shift circuit 14 is gradually shifted to coincide with the receiving clock $CLK_i$, and reaches coincidence at the time t5, thus returning the repeater to the normal state.

As shown in FIG. 8, the phase and frequency of the clock supplied to the frame regenerating circuit always changes gradually, and the timing of the change of the frame synchronization signal SYNC2 from the timing generated from the master clock $CLK_m$ to the timing synchronizing with the frame synchronization signal SYNC1, is also carried out continuously, i.e., with no phase shift.

Thus, according to the present invention, the occurrence of a loss of frame synchronization can be avoided.

I claim:

1. A repeater comprising:
    a received frame timing detecting portion which extracts a receiving clock from a received frame-multiplexed signal, detects a timing of frame synchronization in said received signal, and outputs an alarm signal which indicates whether or not said timing of frame synchronization is successfully detected;
    a master clock generator which generates a master clock;
    a frame synchronization phase comparator which detects a coincidence between said timing of frame synchronization detected in said received signal and a timing of frame synchronization in a regenerated frame-multiplexed signal;
    a switching circuit the output of which is said receiving clock except: said output is switched to said master clock when said alarm signal indicates a failure of said detection, and said output is switched back to said receiving clock when said alarm signal indicates a successful detection and said coincidence is simultaneously detected;
    a clock phase gradual shift circuit which receives the output of said switching circuit as an input clock, outputs an output clock synchronized with said input clock except that a phase shift resulting from an abrupt phase shift occurring in the input clock, gradually appears in an output clock after the abrupt phase shift in the input clock;
    a frame regenerating portion which receives the output of said clock phase gradual shift circuit as a clock, determines said timing of frame synchronization in a regenerated frame-multiplexed signal, and regenerates said frame-multiplexed signal corresponding to said received signal, wherein said timing of frame synchronization in said regenerated frame-multiplexed signal is synchronized with said timing of frame synchronization detected in said received signal when said timing of frame synchronization is supplied, and said timing of frame synchronization in said regenerated frame-multiplexed signal is generated from said output of said clock phase gradual shift circuit when said timing of frame synchronization is not supplied; and
    a gate which receives said timing of frame synchronization detected in said received signal and supplies said timing of frame synchronization only when said alarm signal indicates a successful detection and said coincidence is simultaneously detected.

2. A repeater according to claim 1, wherein said clock phase gradual shift circuit comprises a phase-lock loop circuit.

3. A repeater according to claim 1, wherein said switching circuit comprises a selector switch which outputs said master clock or said receiving clock selectively; and a switch control circuit which outputs a control signal for switching the output of said selector switch to said master clock when said alarm signal indicates a failure of said detection, and switching said output back to said receiving clock when said alarm signal indicates a successful detection and said coincidence is simultaneously detected.

* * * * *